(12) United States Patent
Fukuzono et al.

(10) Patent No.: US 7,260,806 B2
(45) Date of Patent: Aug. 21, 2007

(54) PRINTED WIRING BOARD DESIGN AIDING APPARATUS, PRINTED WIRING BOARD DESIGN AIDING METHOD, AND PRINTED WIRING BOARD DESIGN AIDING PROGRAM

(75) Inventors: Kenji Fukuzono, Kawasaki (JP); Hideaki Yoshimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 290 days.

(21) Appl. No.: 11/167,264

(22) Filed: Jun. 28, 2005

(65) Prior Publication Data

US 2006/0212155 A1   Sep. 21, 2006

(30) Foreign Application Priority Data

Mar. 17, 2005   (JP) .............................. 2005-076719

(51) Int. Cl.
G06F 17/50      (2006.01)
G06F 19/00      (2006.01)

(52) U.S. Cl. ..................... 716/15; 716/1; 716/4; 703/2

(58) Field of Classification Search ................... 716/1, 716/4, 15
See application file for complete search history.

(56) References Cited

U.S. PATENT DOCUMENTS 5,868,887 A * 2/1999 Sylvester et al. ........... 156/150
5,888,630 A * 3/1999 Sylvester et al. ........... 428/212
7,139,678 B2 * 11/2006 Kobayashi et al. ......... 702/183
7,222,316 B2 * 5/2007 Fukuzono et al. ............. 716/4

FOREIGN PATENT DOCUMENTS

| JP | 6-349917 | 12/1994 |
| JP | 2004-13437 | 1/2004 |
| JP | 2005-050137 | * 2/2005 |

* cited by examiner

*Primary Examiner*—Paul Dinh
*Assistant Examiner*—Patrick Sandoval
(74) *Attorney, Agent, or Firm*—Westerman, Hattori, Daniels & Adrian, LLP.

(57) ABSTRACT

The present invention provides a printed wiring board design aiding apparatus, method, and program that can easily and inexpensively predict the displacement of a printed wiring board of complicated shape and configuration due to temperature change. The printed wiring board design aiding program makes a computer execute the steps including a mesh division step that divides an analytical model of a printed wiring board obtained as data into meshes, a mesh displacement calculation step that calculates displacements of respective meshes of a printed wiring board which is divided in the mesh division step, a mesh displacement connection step that connects mesh displacements calculated in the mesh displacement calculation step so that the inclination of borders of respective meshes become equal, and a displacement calculation step that calculates a displacement using an entire displacement of a printed wiring board which is obtained in the mesh displacement connection step.

17 Claims, 12 Drawing Sheets

DISPLACEMENT QUANTITY

LOW DENSITY

* INSULATING LAYER THICKNESS
DIRECTLY ON WIRING LAYER BECOMES
LOW TO BRING ABOUT A DIFFERENCE
BETWEEN LOW AND HIGH THICKNESSES

PRINTED WIRING BOARD DESIGN AIDING APPARATUS, PRINTED WIRING BOARD DESIGN AIDING METHOD, AND PRINTED WIRING BOARD DESIGN AIDING PROGRAM

BACKGROUND OF THE INVENTION

1. Field of the Invention

The present invention relates to a printed wiring board design aiding apparatus, a printed wiring board design aiding method, and a printed wiring board design aiding program that calculate a deflection quantity and a warpage quantity of a printed wiring board.

2. Description of Related Art

Heretofore, a wiring pattern design in a printed wiring board uses an automatic tool and the like on the basis of a design rule (a width, a thickness, an interval and the like of a wiring) and is manufactured without considering conditions of material selection, manufacturing process and the like. Therefore, a deflection (displacement) and the like effected by influence of a temperature change in a temperature processing step might be sometimes increased after the printed wiring board has been completed. In such a case, it is repeated to again manufacture the printed wiring board by altering the design.

As a conventional technique which can determine a position of a reinforcing section of a printed wiring board by a simple and more rational method, a technique is known comprising a step of embedding a dummy material lowered in rigidity in a groove section of a multi-surface printed wiring board as compared with its peripheral portion, a step of obtaining a stress or deformation quantity distribution of the groove section by performing a warpage and deformation simulation to the multi-surface printed wiring board embedding a dummy material, and a step of specifying a high stress portion or a high deformation quantity portion in the groove section on the basis of the obtained stress or deformation quantity distribution (e.g., Patent Document 1: Jpn. Pat. Appln. Laid-Open Publication No. 10-93206).

However, since a problem becomes clear after a printed wiring board has been manufactured in the above-mentioned conventional technique, a repetition of a cycle of designing and manufacturing the printed wiring board has been increased to prolong a developing period and to increase its cost. If a problem considered in advance in the case that a displacement is increased is intended to be predicted by using a three-dimensional analysis and the like, a huge number of factors have been brought about in the conventional analysis method and, therefore there is raised a problem that the analysis becomes complicated, requiring work and time cost.

Even in the above-mentioned patent document 1, the displacement of such a complicated printed wiring board due to temperature change cannot be easily predicted.

SUMMARY OF THE INVENTION

The present invention has been made to solve the above-mentioned conventional problems and has an object to provide a printed wiring board design aiding apparatus, a printed wiring board design aiding method, and a printed wiring board design aiding program which are capable of easily and inexpensively predicting a displacement of a printed wiring board according to its temperature change.

So as to solve the above-mentioned problems, the present invention provides a printed wiring board design aiding apparatus that calculates a displacement brought about in a printed wiring board, including: a mesh division section that divides an analytical model of a printed wiring board obtained as data into meshes; a mesh displacement calculation section that calculates displacements of respective meshes of a printed wiring board which is divided by the mesh division section; a mesh displacement connection section that connects mesh displacements calculated by the mesh displacement calculation section so that the inclination of borders of respective meshes become equal; and a displacement calculation section that calculates a displacement using an entire displacement of a printed wiring board which is obtained by the mesh displacement connection section.

The displacement calculation section has a spin compensation calculation section that performs spin compensation so that the displacement of two corners of the printed wiring board becomes zero, and calculates a displacement for the entire displacement that underwent spin compensation at the spin compensation calculation section. The mesh division section divides a printed wiring board along the x-axis and y-axis in the orthogonal coordinate system, and the mesh displacement connection section connects mesh displacements from predetermined start point meshes $(x_1, y_m(m=1$ to $N2))$ in the x-axis direction to end point meshes $(x_{N1}, y_m)$ in the x-axis direction so that the inclination of borders of respective meshes in the x-axis direction of (x, z) plane become equal, and connects mesh displacements from predetermined start point meshes $(x_n(n=1$ to $N1), y_1)$ in the y-axis direction to end point meshes $(x_n, y_{N2})$ in the y-axis direction so that the inclination of borders of respective meshes in the y-axis direction of (y, z) plane become equal.

The displacement calculation section has a mean displacement calculation section that obtains the root-mean-square value of displacements for the z-axis calculated in the x-axis and y-axis direction, and sets thus obtained value to a displacement. The displacement calculation section has a spin compensation calculation section that performs spin compensation so that z coordinate values of two corners of the printed wiring board calculated at the mean displacement calculation section agree with each other, and calculates a displacement using z coordinate values of respective meshes that underwent spin compensation at the spin compensation calculation section.

The printed wiring board design aiding apparatus further includes: a layer thickness calculation section that obtains a mean thickness of an essential material forming a layer at each layer constructing the printed wiring board with respect to an area of the printed wiring board according to a predetermined rule; and a laminate model forming section that forms a simple laminate model by laminating layers each having a layer thickness calculated by the layer thickness calculation section, and sets thus formed simple laminate model to an analytical model of the printed wiring board. As the predetermined rule, the layer thickness calculation section obtains a mean thickness of a first layer by including a volume of the same material as the essential material of the first layer in the second layer in a volume of an essential material of the first layer when the same material as the essential material of the first layer is included in the second layer adjacent to the first layer. Also, as the predetermined rule, the layer thickness calculation section obtains a mean thickness of a third layer without including a volume of the same material as the essential material of the third layer in the fourth layer in a volume of an essential material of the third layer when the same material as the essential material of the third layer is included in the fourth layer adjacent to the third layer.

Furthermore, the present invention provides a printed wiring board design aiding program that makes a computer calculate a displacement brought about in a printed wiring board, the program making a computer execute the steps including: a mesh division step that divides an analytical model of a printed wiring board obtained as data into meshes; a mesh displacement calculation step that calculates displacements of respective meshes of a printed wiring board which is divided in the mesh division step; a mesh displacement connection step that connects mesh displacements calculated in the mesh displacement calculation step so that the inclination of borders of respective meshes become equal; and a displacement calculation step that calculates a displacement using an entire displacement of a printed wiring board which is obtained in the mesh displacement connection step.

Furthermore, the present invention provides a printed wiring board design aiding method of calculating a displacement brought about in a printed wiring board, including: a mesh division step that divides an analytical model of a printed wiring board obtained as data into meshes; a mesh displacement calculation step that calculates displacements of respective meshes of a printed wiring board which is divided in the mesh division step; a mesh displacement connection step that connects mesh displacements calculated in the mesh displacement calculation step so that the inclination of borders of respective meshes become equal; and a displacement calculation step that calculates a displacement using an entire displacement of a printed wiring board which is obtained in the mesh displacement connection step.

As described above, according to the present invention, the displacement of a printed wiring board of complicated shape and configuration due to temperature change can be easily and inexpensively predicted.

DETAILED DESCRIPTION OF THE PREFERRED EMBODIMENTS

In the following, embodiments of the present invention will be described in detail with reference to the accompanying drawings.

Figure 1:
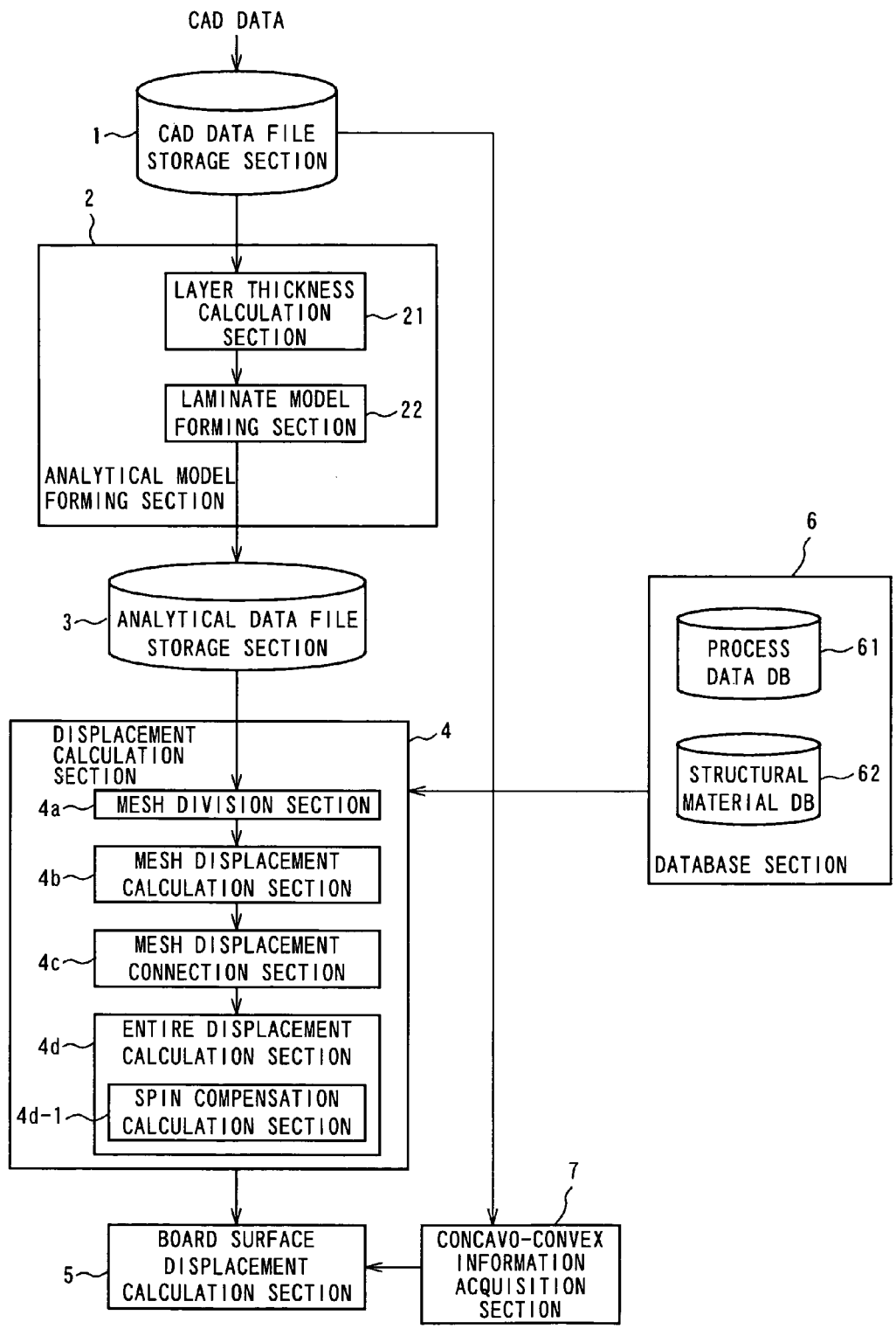
FIG. 1 is a block diagram showing a structure of an embodiment of the present invention.

FIG. 1 is a block diagram showing a printed wiring board design aiding apparatus in the first embodiment of the present invention. This printed wiring board design aiding apparatus includes a CAD data file storage section 1 for storing CAD data, with which a printed wiring board is designed, an analytical model forming section 2 for forming an analytical model by shape converting using the CAD data file stored in the CAD data file storage section 1, an analytical data file storage section 3 for temporarily storing the analytical model formed by the analytical model forming section 2, an analyzing section (displacement calculation section) 4 for calculating a displacement raised in a temperature process by using the analytical data file stored in the analytical data file storage section 3, a board surface displacement calculation section 5 for calculating a displacement of a board surface on the basis of the displacement calculated by the displacement calculation section 4, a database section 6 for supplying data necessary for its analysis, and a concavo-convex information acquisition section 7 for acquiring concavo-convex information to be used in the board surface displacement calculation section 5 from the CAD data file storage section 1.

The displacement calculation section 4 includes a mesh division section 4a for dividing a printed wiring board into meshes, a mesh displacement calculation section 4b for calculating displacements of respective meshes, a mesh displacement connection section 4c for connecting mesh displacements of the entire meshes, and an entire displacement calculation section 4d, and the entire displacement calculation section 4d has a spin compensation calculation section 4d-1 for performing spin compensation for the entire displacement.

In the above-mentioned structure, the analytical model forming section 2 is adapted to form an analytical model of a printed wiring board on the basis of a CAD data file, and includes a layer thickness calculation section 21 for obtaining a layer thickness for each layer in a plurality of layers constructing the printed wiring board, and a laminate model forming section 22 for forming an analytical simple laminate model (analytical model) by laminating layers having calculated layer thickness.

The database (DB) section 6 includes a process data DB 61 for storing a processing temperature and the like in a manufacturing process, and a structural material DB 62 for storing physical property information necessary to calculate a temperature displacement, such as, for example, a thermal expansion coefficient, a Young's modulus and the like as physical property information relating to an essential material for constructing the respective layers of the printed wiring board, that is, the materials of the respective layers formed by the laminate model forming section 22.

The concavo-convex information acquisition section 7 acquires the concavo-convex information from the CAD data file storage section 1, as will be described later.

An operation of the first embodiment according to the present invention will be explained.

Figure 2:
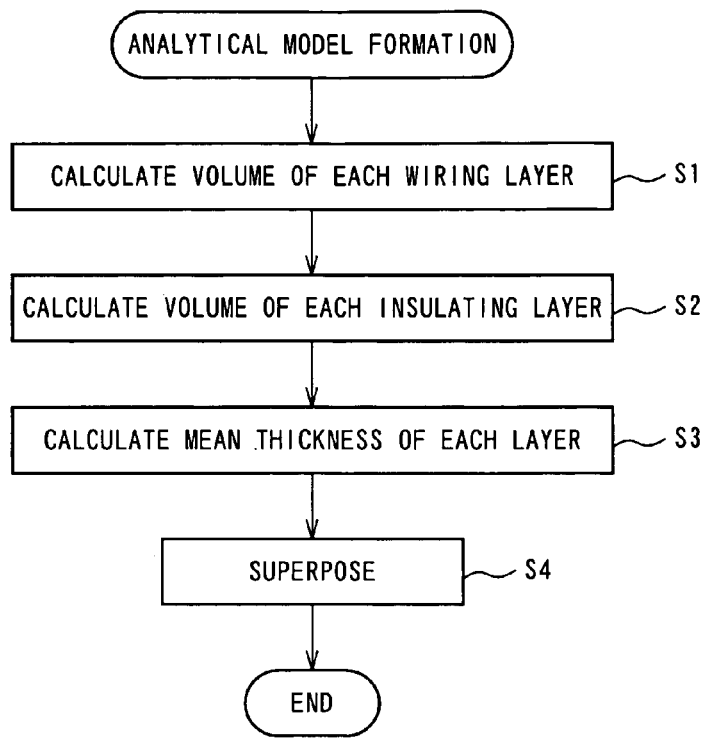
FIG. 2 is a flow chart showing a model (simple laminate model) forming operation for an analysis in the embodiment of the present invention.

FIG. 2 is a flow chart showing an analytical model forming operation in the analytical model forming section 2.

Figure 3:
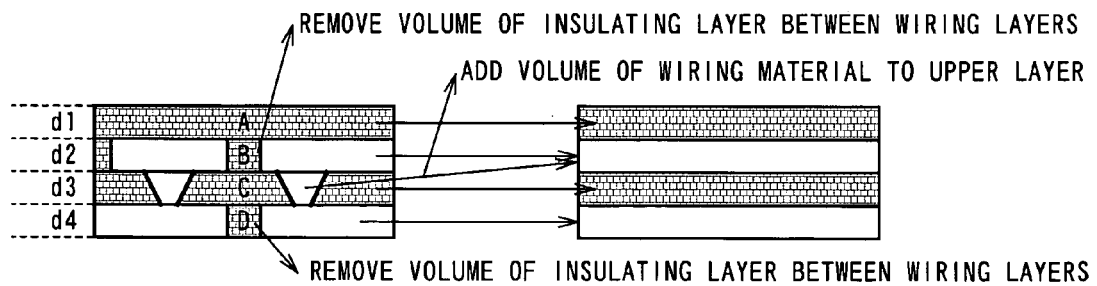
FIG. 3 is a diagram for explaining a rule used when a simple laminate model is formed.

First, a volume of an essential material for constructing a layer is calculated for each layer for constructing a printed wiring board according to a predetermined rule with printed wiring board data obtained from the CAD data file storage section 1 (steps S1 and S2). For example, as shown in FIG. 3, in case the printed wiring board includes, from the lowermost layer, a wiring layer (d4), an insulating layer (d3), a wiring layer (d2), and an insulating layer (d1), the volumes of the respective wiring layers are calculated (step S1), and then the volumes of the respective insulating layers are calculated (step S2).

In an operation of step S1, as a first rule, in case an amount of an insulating material different from a wiring material of an essential material is included in the wiring layer (for example, d2: corresponding to the first layer of the present invention), the volume of the amount of the insulating material in its wiring layer is ignored. In case the same wiring material as the wiring layer is included through a via and the like in the wiring layer (d3: corresponding to the second layer) adjacent to (to be superposed at a lowest side) the wiring layer, the volume of the wiring material is added to that of the essential material of the wiring layer (d2), and the volume of the wiring layer (d3) is calculated.

In an operation of the step S2, as a second rule, in case a wiring material exists in the insulating layer (d3: corresponding to the third layer) through a via and the like, the volume of the wiring material is ignored (included in the volume of the wiring layer of its upper layer side). Also, even if the same insulating material as the insulating layer is included in the wiring layer (d4: corresponding to the fourth layer) (to be superposed at the lower side) adjacent to the insulating layer, the volume of the insulating material is not added to the insulating layer (d3) like the first rule, and the volume of the insulating layer is calculated.

In this manner, when the volume of each layer is calculated, a mean thickness of each layer is then calculated (step S3). This calculation is executed by dividing the volume of each layer by the area of the board. When the mean thickness of each layer is calculated, a simple laminate model (analytical model) obtained by superposing and simplifying the respective layers each having its mean thickness is formed (step S4).

Figure 4A:
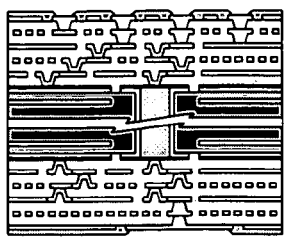
FIG. 4A to FIG. 4D are diagrams conceptually showing the formation of a concrete model for an analysis.
Figure 4B:
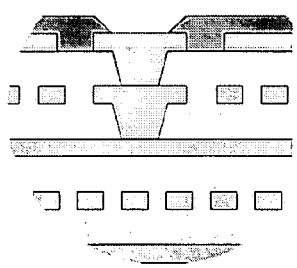
Figure 4C:
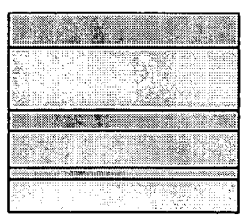
Figure 4D:
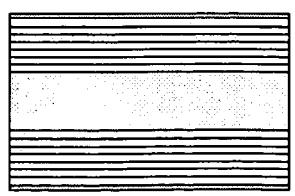

FIG. 3 shows a simple example for the convenience of explaining an analytical model formation. As shown in FIG. 4, a printed wiring board having more complicated structure is similarly applied. In FIG. 4, FIG. 4A shows a sectional structure of a printed wiring board, FIG. 4B shows a detailed sectional structure of a portion of the sectional structure of the printed wiring board, FIG. 4C shows the case that the structure of the portion shown in FIG. 4B is simplified by the same process as that shown in FIG. 2 and FIG. 3, and FIG. 4D shows the case that the structure of the entirety of FIG. 4A is simplified by the same process as that shown in FIG. 2 and FIG. 3. That is, FIG. 4D shows a simple laminate model (analytical model) formed from the printed wiring board of FIG. 4A.

In this manner, the analytical model forming section 2 obtains a mean thickness of an essential material (for example, a wiring material and an insulating material) for constructing its layer at each layer for constructing its printed wiring board from the printed wiring board having a complicated structure with respect to the area of the board according to predetermined rules (first and second rules), and forms a simple laminate model (analytical model of the printed wiring board) by laminating the layers of the obtained layer thickness.

Next, the operation of the displacement calculation section 4 that calculates a displacement of a printed wiring board using the formed simple laminate model, and the operation of the board surface displacement calculation section 5 that calculates a surface displacement of a board using thus obtained displacement will be explained by referring to a flow chart shown in FIG. 5.

Figure 6:
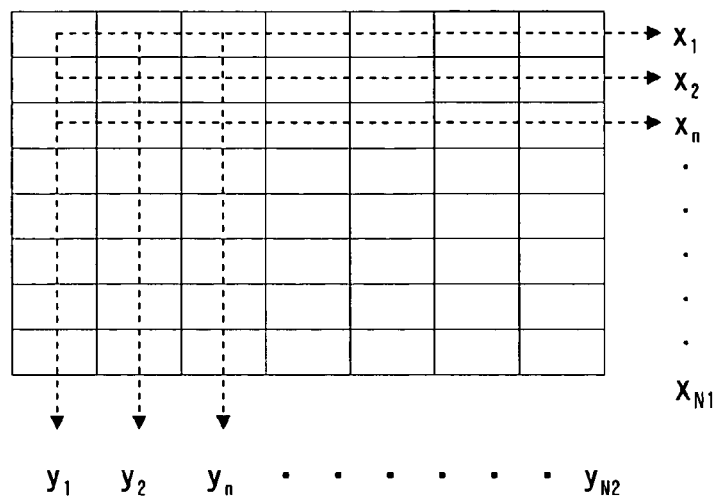
FIG. 6 is an explanatory diagram showing an example of the method of dividing an analytical model of a printed wiring board.
Figure 7A:
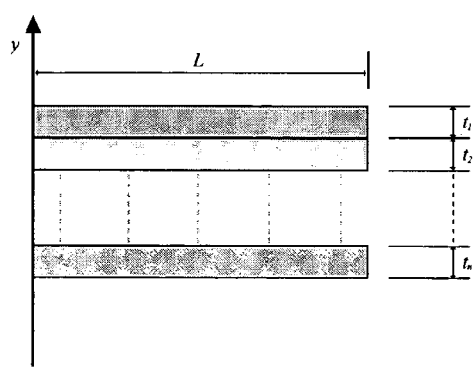
FIG. 7A and FIG. 7B are views for explaining the concept of displacement calculation.
Figure 7B:
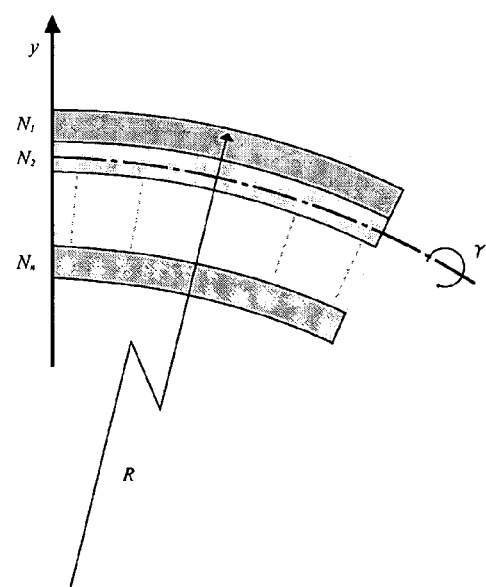

Firstly, the displacement calculation section 4 acquires simple laminate model data from the analytical data file storage section (step S11), and the mesh division section 4a divides a model into meshes in the lattice-forming manner (step S12). In the lattice-forming division, as shown in FIG. 6, at Z=0 in the orthogonal coordinate system, the plane of a rectangular printed wiring board is so arranged as to overlap the (x, y) plane formed by the x-axis and y-axis, and is divided into plural meshes (for example, N1, N2) equally along the x-axis and y-axis. Next in step S13, the mesh displacement calculation section 4b calculates a displacement corresponding to a process temperature changing part for respective meshes divided into a lattice (step S13). The displacement (displacement quantity) is a displacement brought about as shown in FIG. 7B from the difference of its thermal expansion coefficient and Young's modulus when a model of the cantilever beam shape being each mesh shown in FIG. 7A receives a temperature change. The thermal expansion coefficient and the Young's modulus are acquired from the structural material DB 62, and a process temperature change is acquired from the process data DB 61.

This calculating method is well known, and, therefore, its explanation here is omitted. As one example, a calculation formula of a warp due to a difference of a thermal expansion coefficient of a multilayer laminate board disclosed in an evaluation of a stress/deformation of a printed board according to a mechanical multilayer beam theory in a collection of theses of Japan society of mechanical engineers, Vol. 59, No. 563, 1993-7 (by Oda Juhachi et al) can be used.

In this manner, when the displacement brought about due to the temperature change is calculated for all the meshes, the mesh displacement connection section 4c connects displacements calculated for the respective meshes in the following manner (step S14).

1. Processing in the X-Axis Direction (a) Starting in the x-axis direction from a mesh at the origin $(x_1, y_1)$ shown in FIG. 6 set to be the start point mesh (the first mesh), a curve is drawn until the division border with a curvature of a displacement (warpage) of the first mesh.

Figure 8:
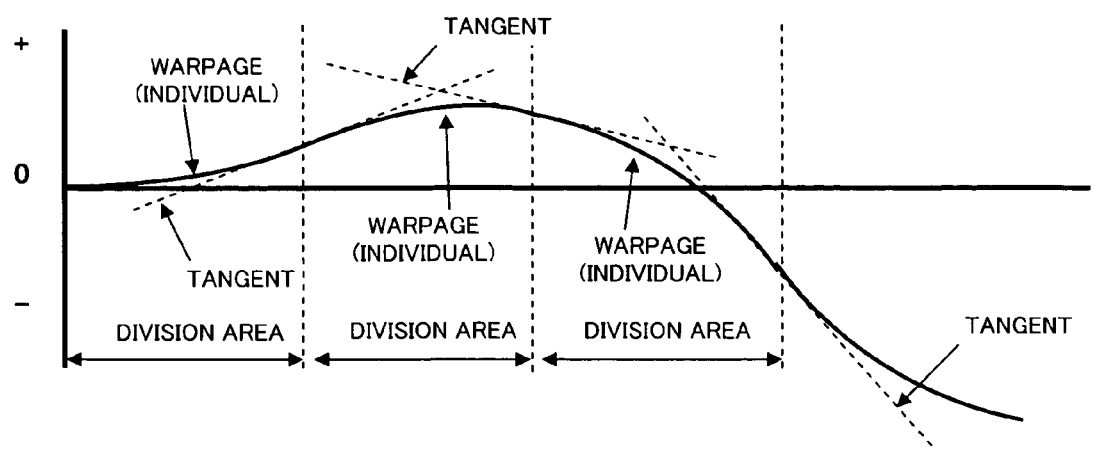
FIG. 8 is an explanatory diagram showing the appearance of connecting mesh displacements of a plurality of meshes.
Figure 9A:
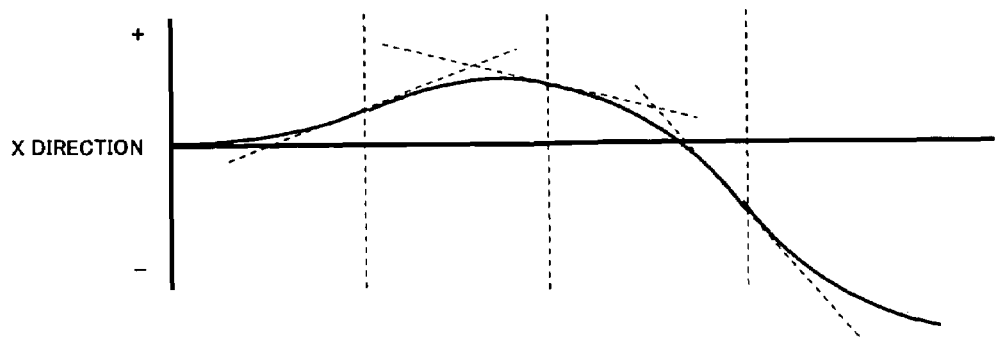
FIG. 9A to FIG. 9C are diagrams showing the result of mesh displacement connection.

(b) Next, a tangent is drawn at the division border, and a displacement (warpage) of the second mesh is drawn with the tangent set to be the axis. This processing is repeated in the x-axis direction until an N1-th mesh $(x_{N1}, y_1)$ or the last mesh. FIG. 8 shows the drawing processing, and FIG. 9A is the result.

Figure 10A:
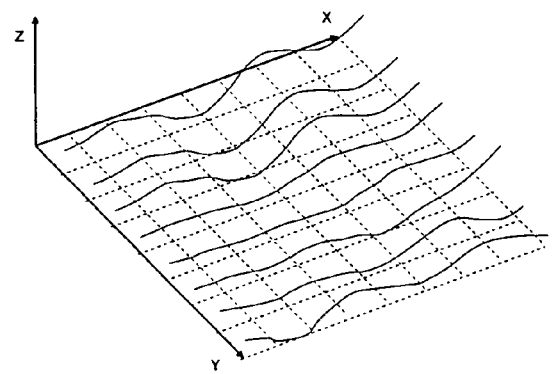
FIG. 10A to FIG. 10D are three-dimensional graphics showing the result of mesh displacement connection.

(c) Above-described processing (a) and (b) is carried out from a mesh $(x_1, y_2)$ set to be the start point mesh which adjoins the mesh at the origin $(x_1, y_1)$ in the y-axis direction, and the processing is repeated for meshes $(x_1, y_m)$, where m=1 to N2, and is 3 or more in this embodiment. FIG. 10A shows a diagram of thus obtained display image.

2. Processing in the y-Axis Direction (a) Starting in the y-axis direction from a mesh at the origin $(x_1, y_1)$ shown in FIG. 6 set to be the start point mesh (the first mesh), a curve is drawn until the division border with a curvature of a displacement (warpage) of the first mesh.

Figure 9B:
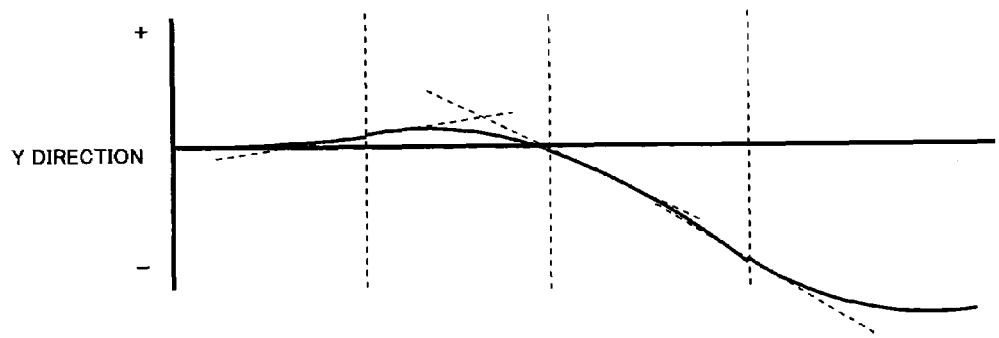

(b) Next, a tangent is drawn at the division border, and a displacement (warpage) of the second mesh is drawn with the tangent set to be the axis. This processing is repeated in the y-axis direction until an N2-th mesh $(x_1, y_{N2})$ or the last mesh. FIG. 9B is the result.

Figure 10B:
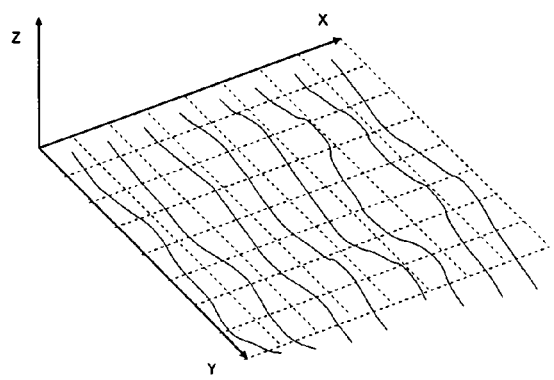

(c) Above-described processing (a) and (b) is carried out from a mesh $(x_2, y_1)$ set to be the start point mesh which adjoins the mesh at the origin $(x_1, y_1)$ in the x-axis direction, and the processing is repeated for meshes $(x_n, y_1)$, where n=1 to N1, and is 3 or more in this embodiment. FIG. 10B shows a diagram of thus obtained display image.

Figure 9C:
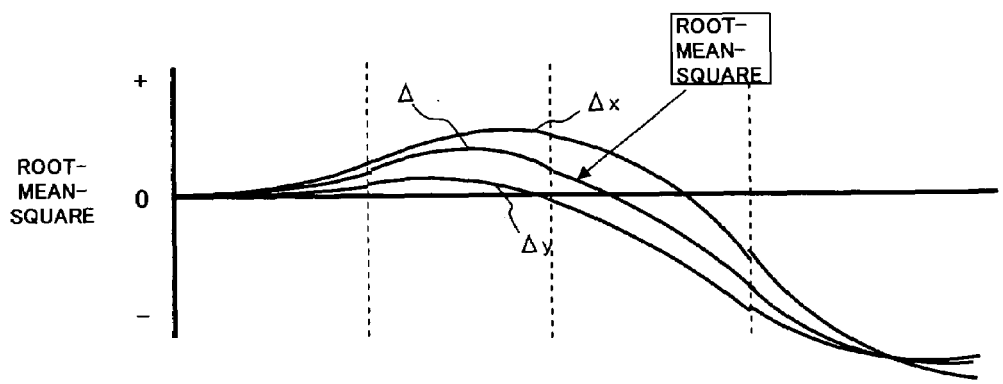
Figure 10C:
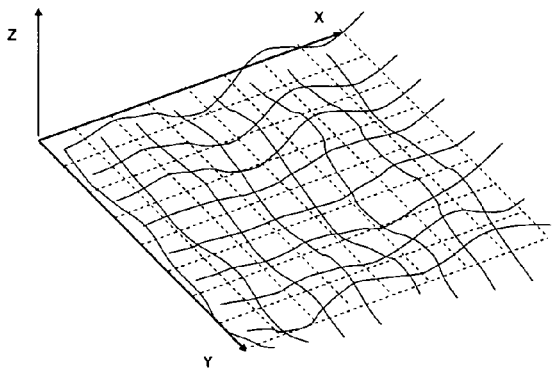
Figure 10D:
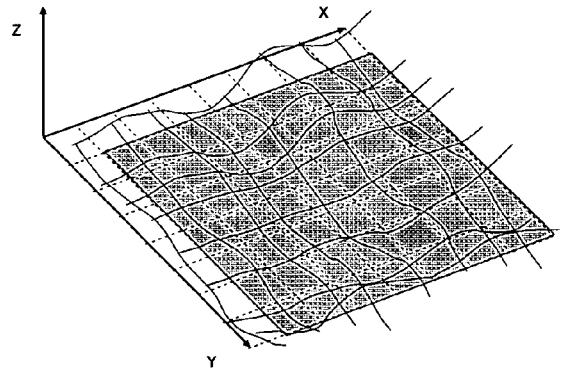

When displacements in the x-axis and y-axis directions of respective meshes are obtained, then the entire displacement calculation section 4d calculates a displacement of the entire meshes (step S15). Firstly, the entire displacement calculation section 4d obtains the root-mean-square value of displacements calculated in the x-axis and y-axis directions for respective meshes, and sets thus obtained value to be a calculated displacement of the respective meshes. FIG. 9C shows displacements Δx, Δy calculated in the x-axis and y-axis direction, and a displacement Δ that is the root-mean-square value thereof. FIG. 10C shows a three-dimensional graphics that is obtained by superposing the displacements calculated in the x-axis and y-axis directions on the same meshes, and FIG. 10D shows a three-dimensional graphics of the displacement Δ.

Figure 11:
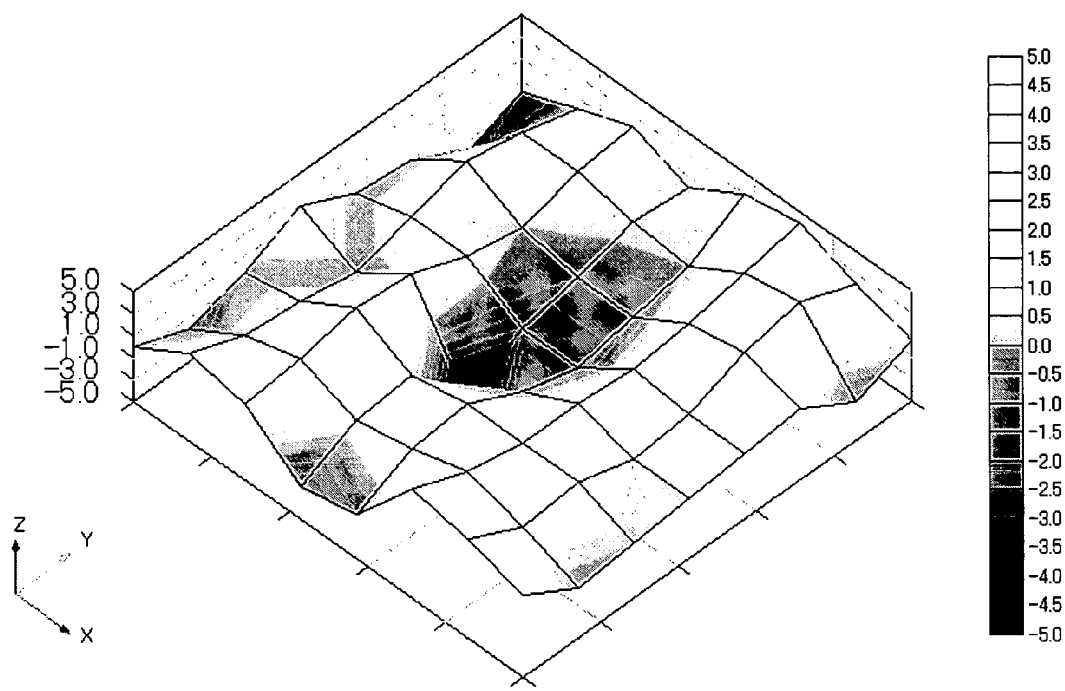
FIG. 11 is a three-dimensional graphics of an entire displacement.

Next, when the entire displacement calculation section 4d obtains the displacements, the spin compensation calculation section 4d-1 performs spin compensation so that heights of two corners of the printed wiring board, for example, a mesh corner of $(x_1, y_1)$ and a mesh corner of $(x_{N1}, y_{N1})$, become equal. As the corners, two corners who have the largest displacement in the z-axis direction can be selected. FIG. 11 shows a three-dimensional graphics of a displacement obtained after the spin compensation.

Figures 12A, 12B, 12C:
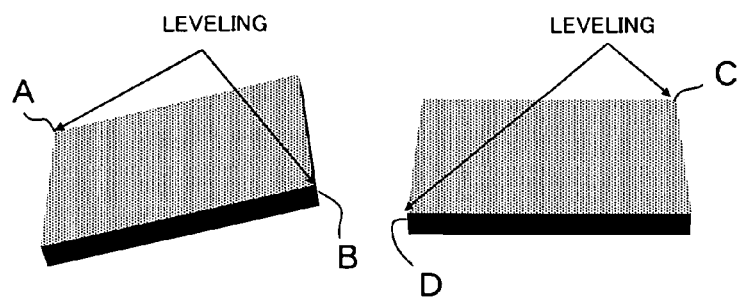
FIG. 12A to FIG. 12C are explanatory diagrams showing the operation of spin compensation.

FIG. 12 shows the appearance of the spin compensation, in which A, B in FIGS. 12A and C, D in FIG. 12B that bring about the maximum displacement difference are selected and spin compensation is performed as shown in FIG. 12C. In case heights of two corners are equal, it is not necessary to perform spin compensation.

After the spin compensation is performed, corrected displacements (compensation displacement) of the entire meshes can be obtained by the spin compensation result, and the maximum displacement can be obtained by calculating the difference of the maximum value and the minimum value of the displacement values, and the maximum warpage and the maximum distortion can be obtained.

Then, the board surface displacement calculation section 5 calculates a board surface displacement using the corrected displacements of the respective meshes obtained by the entire displacement calculation section 4d. That is, the board surface displacement calculation section 5 adds or subtracts a concavo-convex quantity on the surface of the printed wiring board which can be obtained from the design data of the CAD data file storage section 1 by the concavo-convex information acquisition section 7 to or from the displacement quantity obtained by the displacement calculation section 4 to obtain the displacement quantity of the surface of the printed wiring board (step S13).

Figure 13A:
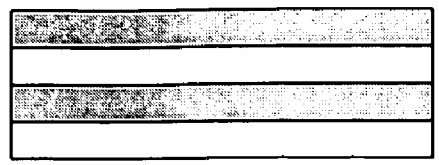
FIG. 13A to FIG. 13C are diagrams showing convexo-concave information of a board.
Figure 13B:
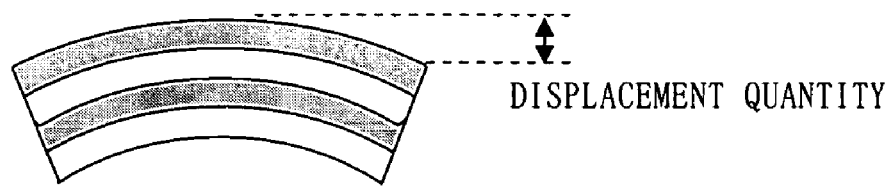
Figure 13C:
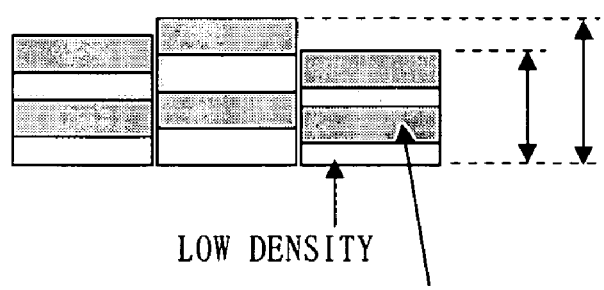

It should be noted that this concavo-convex is brought about due to the difference of the thickness of the wiring layer in an inward direction in the surface of the board. In a region having a thin wiring layer, a concave portion is easily formed as compared with a region having a thick wiring layer (the region having the thick wiring layer is easily formed with a convex portion as compared with a region having a thin wiring layer). Therefore, as shown, for example, in FIG. 13A, in the board having the wiring layer of a constant thickness, the respective portions on the surface of the board are exposed in the displacement obtained as shown in FIG. 13B, by the simple laminate model. On the other hand, in a region having, for example, a thin wiring layer as shown in FIG. 13C, a concave portion is formed on the surface, and it is preferable that its displacement is obtained by adding a depth of its concave portion to the displacement calculated in the step S12.

Figure 14:
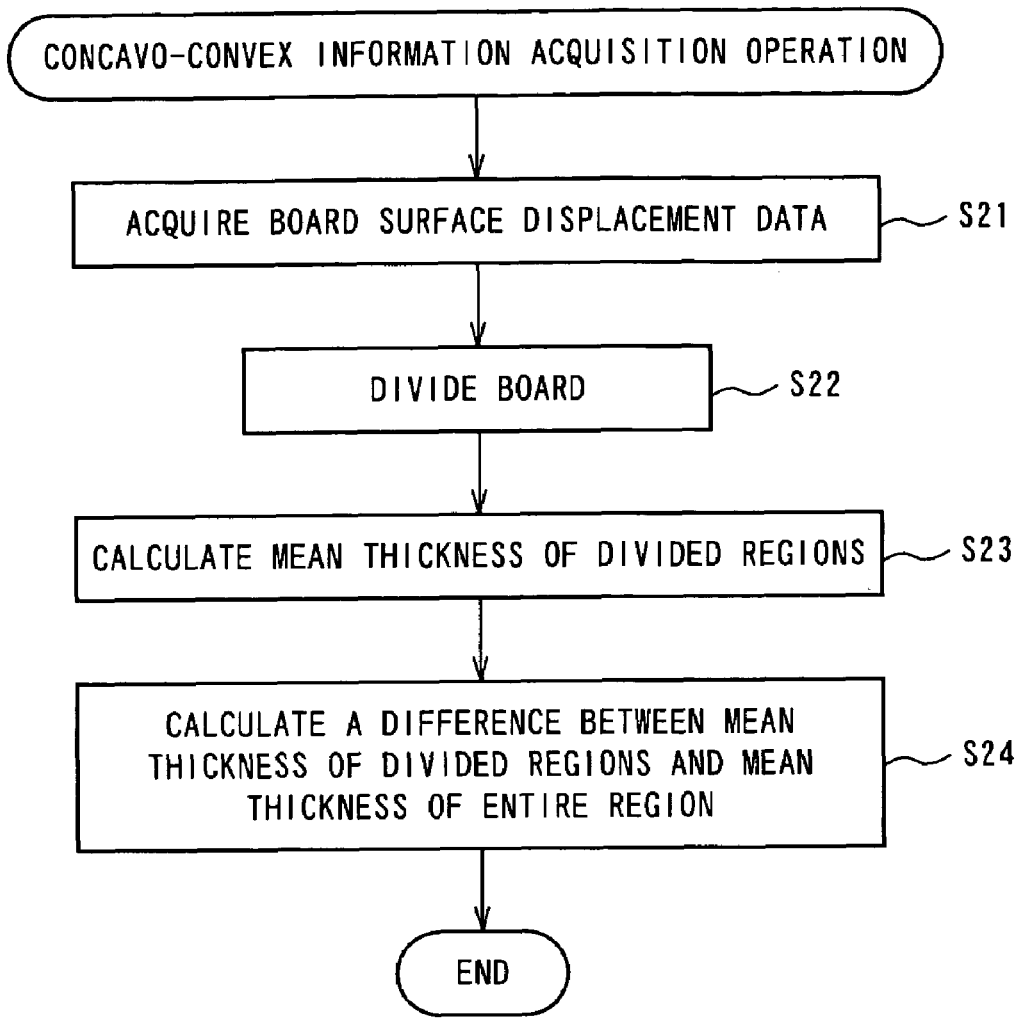
FIG. 14 is a flow chart showing an acquisition operation of convexo-concave information.

FIG. 14 is a flow chart showing a concavo-convex information acquisition operation by the concavo-convex information acquisition section 7. First, board surface displacement data at a designing time is acquired from a CAD data file (step S21). Then, the concavo-convex information acquisition section 7 divides the board by a predetermined shape (step S22), and calculates the mean thickness of the board in each of the divided respective regions (step S23). Then, a difference between the mean thickness of the board in the respective divided regions and the mean value of the thickness of the board in the entire region of the board is obtained (step S24).

Figure 5:
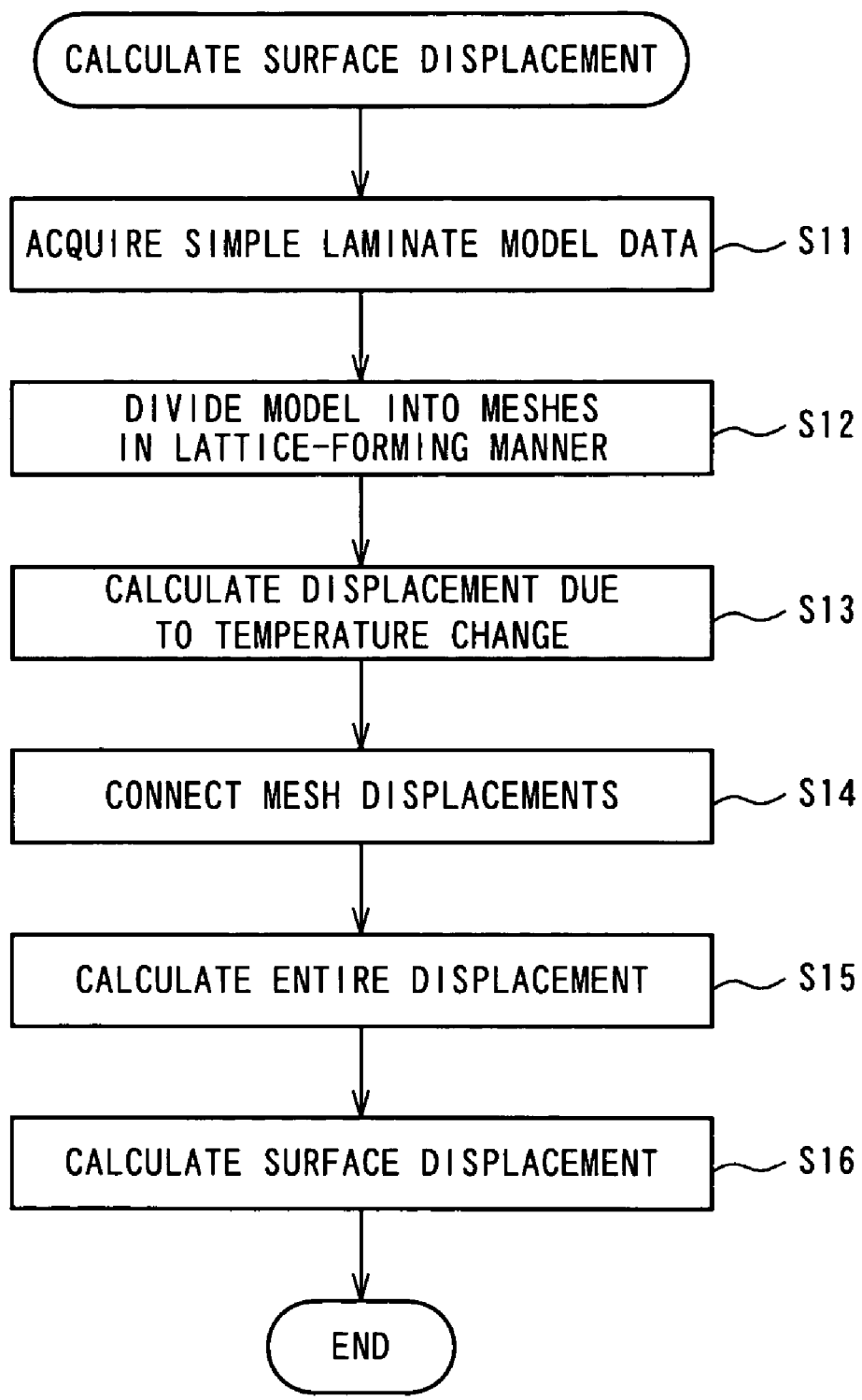
FIG. 5 is a flow chart showing a surface displacement calculation processing operation in the embodiment.

In a displacement calculation shown in FIG. 5 (step S13), the difference of the thicknesses obtained in step S24 is added to the displacement in each region acquired in step S15 to obtain the surface displacement of the board. Incidentally, one example of the method for calculating the surface displacement by considering the concavo-convex has been explained here. On the other hand, it should be noted that the present invention may adopt a method except the above-mentioned method for adopting the mean thickness of the board as a reference, such as, a method for adopting the minimum thickness of the board as a reference, a method for adopting the maximum thickness of the board as a reference and the like.

Although description has been made of a case where the embodiments of the present invention have been applied to the multilayer made of the wiring layers and the insulating layers, the present invention can be applied to a case where a layer including other than the wiring layer and the insulating layer. According to the present invention, the steps in the above-mentioned flowchart of FIG. 5 are provided as the board design aiding program for executing a computer constructing the board design aiding apparatus. The above-mentioned program can be executed in the computer constructing the board design aiding apparatus by storing the recording medium readable by the computer. Here, as the recording medium readable by the above-mentioned computer, a portable type storage medium, such as, a CD-ROM, a flexible disc, a DVD disc, a magneto optical disc, an IC card and the like, a database for holding a computer program or other computer as well as its database, and further a transmission medium on a line are included.

What is claimed is:

1. A printed wiring board design aiding apparatus that calculates a displacement brought about in a printed wiring board, comprising:

a mesh division section that divides an analytical model of a printed wiring board obtained as data into meshes;

a mesh displacement calculation section that calculates displacements of respective meshes of a printed wiring board which is divided by the mesh division section;

a mesh displacement connection section that connects mesh displacements calculated by the mesh displacement calculation section so that an inclination of borders of respective meshes become equal; and a displacement calculation section that calculates a displacement using an entire displacement of a printed wiring board which is obtained by the mesh displacement connection section.

2. The printed wiring board design aiding apparatus according to claim 1,
wherein the displacement calculation section has a spin compensation calculation section that performs spin compensation so that a displacement of two corners of the printed wiring board becomes zero, and calculates a displacement for an entire displacement that underwent spin compensation at the spin compensation calculation section.

3. The printed wiring board design aiding apparatus according to claim 1,
wherein the mesh division section divides a printed wiring board along an x-axis direction and a y-axis direction in an orthogonal coordinate system, and the mesh displacement connection section connects mesh displacements from predetermined start point meshes ($x_1$, $y_m$(m=1 to N2)) in the x-axis direction to end point meshes ($x_{N1}$, $y_m$) in the x-axis direction so that the inclination of borders of respective meshes in the x-axis direction of (x, z) plane become equal, and connects mesh displacements from predetermined start point meshes ($x_n$(n=1 to N1), $y_1$) in the y-axis direction to end point meshes ($x_n$, $y_{N2}$) in the y-axis direction so that the inclination of borders of respective meshes in the y-axis direction of (y, z) plane become equal.

4. The printed wiring board design aiding apparatus according to claim 3,
wherein the displacement calculation section has a mean displacement calculation section that obtains a root-mean-square value of displacements for a z-axis calculated in the x-axis and y-axis directions, and sets thus obtained value to a displacement.

5. The printed wiring board design aiding apparatus according to claim 4,
wherein the displacement calculation section has a spin compensation calculation section that performs spin compensation so that z coordinate values of two corners of the printed wiring board calculated at the mean displacement calculation section agree with each other, and
calculates a displacement using z coordinate values of respective meshes that underwent spin compensation at the spin compensation calculation section.

6. The printed wiring board design aiding apparatus according to claim 1, further comprising:
a layer thickness calculation section that obtains a mean thickness of an essential material forming a layer at each layer constructing the printed wiring board with respect to an area of the printed wiring board according to a predetermined rule; and
a laminate model forming section that forms a simple laminate model by laminating layers each having a layer thickness calculated by the layer thickness calculation section, and sets thus formed simple laminate model to an analytical model of the printed wiring board.

7. The printed wiring board design aiding apparatus according to claim 6,
wherein, as the predetermined rule, the layer thickness calculation section obtains a mean thickness of a first layer by including a volume of the same material as the essential material of the first layer in the second layer in a volume of an essential material of the first layer when the same material as the essential material of the first layer is included in the second layer adjacent to the first layer.

8. The printed wiring board design aiding apparatus according to claim 7,
wherein, as the predetermined rule, the layer thickness calculation section obtains a mean thickness of a third layer without including a volume of the same material as the essential material of the third layer in the fourth layer in a volume of an essential material of the third layer when the same material as the essential material of the third layer is included in the fourth layer adjacent to the third layer.

9. A printed wiring board design aiding program that makes a computer calculate a displacement brought about in a printed wiring board, the program making a computer execute the steps comprising:
a mesh division step that divides an analytical model of a printed wiring board obtained as data into meshes;
a mesh displacement calculation step that calculates displacements of respective meshes of a printed wiring board which is divided in the mesh division step;
a mesh displacement connection step that connects mesh displacements calculated in the mesh displacement calculation step so that an inclination of borders of respective meshes become equal; and
a displacement calculation step that calculates a displacement using an entire displacement of a printed wiring board which is obtained in the mesh displacement connection step.

10. The printed wiring board design aiding program according to claim 9,
wherein the displacement calculation step has a spin compensation calculation step that performs spin compensation so that a displacement of two corners of the printed wiring board becomes zero, and calculates a displacement for an entire displacement that underwent spin compensation in the spin compensation calculation step.

11. The printed wiring board design aiding program according to claim 9,
wherein the mesh division step divides a printed wiring board along an x-axis direction and a y-axis direction in an orthogonal coordinate system, and the mesh displacement connection step connects mesh displacements from predetermined start point meshes ($x_1$, $y_m$(m=1 to N2)) in the x-axis direction to end point meshes ($x_{N1}$, $y_m$) in the x-axis direction so that the inclination of borders of respective meshes in the x-axis direction of (x, z) plane become equal, and connects mesh displacements from predetermined start point meshes ($x_n$ (n=1 to N1), $y_1$) in the y-axis direction to end point meshes ($x_n$, $y_{N2}$) in the y-axis direction so that the inclination of borders of respective meshes in the y-axis direction of (y, z) plane become equal.

12. The printed wiring board design aiding program according to claim 11,
wherein the displacement calculation step has a mean displacement calculation step that obtains a root-mean-square value of displacements for a z-axis calculated in the x-axis and y-axis direction, and sets thus obtained value to a displacement.

13. The printed wiring board design aiding program according to claim 12,
wherein the displacement calculation step has a spin compensation calculation step that performs spin compensation so that z coordinate values of two corners of the printed wiring board calculated in the mean displacement calculation step agree with each other, and calculates a displacement using z coordinate values of respective meshes that underwent spin compensation in the spin compensation calculation step.

14. The printed wiring board design aiding program according to claim 9, further comprising, as printed wiring board acquisition steps to acquire a simplified model of the printed wiring board to calculate a displacement as data, which are arranged prior to the mesh division step:
   a layer thickness calculation step that obtains a mean thickness of an essential material forming a layer at each layer constructing a printed wiring board with respect to an area of the printed wiring board according to a predetermined rule; and
   a laminate model forming step that forms a simple laminate model by laminating layers each having a layer thickness calculated in the layer thickness calculation step, and acquiring the printed wiring board to calculate the displacement.

15. A printed wiring board design aiding method of calculating a displacement brought about in a printed wiring board, comprising:
   a mesh division step that divides an analytical model of a printed wiring board obtained as data into meshes;
   a mesh displacement calculation step that calculates displacements of respective meshes of a printed wiring board which is divided in the mesh division step;
   a mesh displacement connection step that connects mesh displacements calculated in the mesh displacement calculation step so that an inclination of borders of respective meshes become equal; and
   a displacement calculation step that calculates a displacement using an entire displacement of a printed wiring board which is obtained in the mesh displacement connection step.

16. The printed wiring board design aiding method according to claim 15,
   wherein the displacement calculation step has a spin compensation calculation step that performs spin compensation so that a displacement of two corners of the printed wiring board becomes zero, and calculates a displacement for an entire displacement that underwent spin compensation in the spin compensation calculation step.

17. The printed wiring board design aiding method according to claim 15,
   wherein the mesh division step divides a printed wiring board along an x-axis direction and a y-axis direction in an ortogonal coordinate system and the mesh displacement connection step connects mesh displacements from predetermined start point meshes $(x_1, y_m(m=1$ to $N2))$ in the x-axis direction to end point meshes $(x_{N1}, y_m)$ in the x-axis direction so that the inclination of borders of respective meshes in the x-axis direction of $(x, z)$ plane become equal, and connects mesh displacements from predetermined start point meshes $(x_n(n=1$ to $N1), y_1)$ in the y-axis direction to end point meshes $(x_n, y_{N2})$ in the y-axis direction so that the inclination of borders of respective meshes in the y-axis direction of $(y, z)$ plane become equal.

* * * * *